United States Patent [19]

Kajikawa

[11] 4,455,032
[45] Jun. 19, 1984

[54] FRONT WHEEL SUSPENSION FOR A MOTOR TRICYCLE AND ASSOCIATED METHOD

[75] Inventor: Tsuneo Kajikawa, Kamifukuoka, Japan

[73] Assignee: Honda Giken Kogyo Kabushiki Kaisha, Tokyo, Japan

[21] Appl. No.: 353,913

[22] Filed: Mar. 2, 1982

[30] Foreign Application Priority Data

Mar. 9, 1981 [JP] Japan .................................. 56-32630

[51] Int. Cl.³ .............................................. B62K 25/04
[52] U.S. Cl. ................................ 280/276; 188/321.11; 267/8 R; 280/279
[58] Field of Search ............... 280/275, 276, 277, 278, 280/279, 688, 689, 690, 692, 695, 696, 700, 721, 722, 724–726; 180/219, 227, 228; 267/8 R, 126, 15 R; 188/321.11

[56] References Cited

U.S. PATENT DOCUMENTS

| | | | |
|---|---|---|---|
| 2,953,395 | 9/1960 | Turner | 280/276 |
| 3,513,926 | 5/1970 | Paget, Jr. | 280/279 |
| 4,278,266 | 7/1981 | Inoue et al. | 280/276 |
| 4,328,960 | 5/1982 | Handke et al. | 280/724 X |
| 4,397,452 | 8/1983 | Fouts | 267/8 R |

Primary Examiner—Joseph F. Peters, Jr.
Assistant Examiner—Mitchell J. Hill
Attorney, Agent, or Firm—Posnack, Roberts, Cohen & Spiecens

[57] ABSTRACT

A front wheel suspension for a motor tricycle comprising a frame having a head pipe, a pair of front forks steerably supported on the head pipe, and a pair of bottom cases slidably fitted on lower portions of the front forks to support a front wheel. Within a closed space formed within the front forks and the bottom cases are arranged a damper to connect the forks and cases and a coil spring for biasing the forks and cases in extended direction to the damper and the coil spring thereby being protected from obstacles and considerably improving the riding comfort.

12 Claims, 4 Drawing Figures

FRONT WHEEL SUSPENSION FOR A MOTOR TRICYCLE AND ASSOCIATED METHOD

BACKGROUND OF THE INVENTION

The present invention relates to a motor tricycle, and principally to a front suspension for the motor tricycle and associated method.

SUMMARY OF THE INVENTION

It is an object of the present invention to provide a front wheel suspension and associated method for a motor tricycle which, on severe roads, such as on waste land, soft land and in snow, can minimize interference of various functional parts with obstacles, improve the riding comfort and enhance the running performance.

The aforesaid and further objects are achieved by the present invention which provides an arrangement wherein a closed space is formed by a pair of front forks steerably supported on a head pipe of a frame and a bottom case supporting a front wheel, and a buffer mechanism composed of a damper and a coil spring is housed in the space thereby to protect the buffer mechanism from obstacles and to greatly enhance the riding comfort.

The above and other objects, features and advantages of the invention will become apparent from the following detailed description of a preferred embodiment when taken in conjunction with the accompanying drawings.

DESCRIPTION OF THE PREFERRED EMBODIMENT

Figure 1:
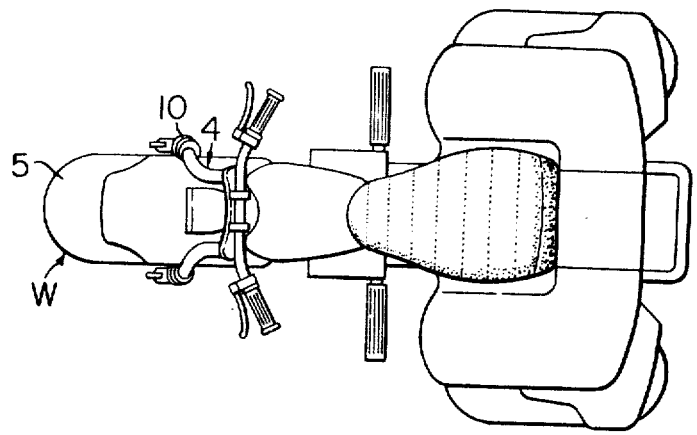
FIG. 1 is a plan view of a motor tricycle provided with a device in accordance with the present invention.
Figure 2:
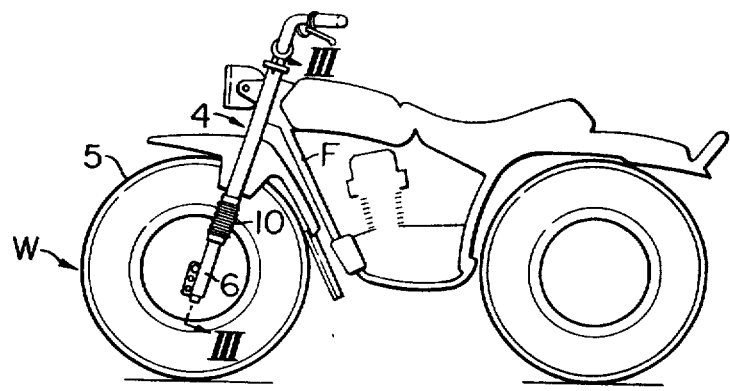
FIG. 2 is a side view thereof.

Hereafter, a description will be given, with reference to the drawings, of an embodiment in which the present invention is applied to a motor tricycle for off road travel and provided with balloon tires. Namely, the tricycle is intended for travel not only on smooth roads, but on rough terrain as well.

The tricycle comprises a frame F having a head pipe 1 with top and bottom bridges 2 and 3 which steerably support a front fork 4 on head pipe 1. The front fork 4 includes on each side an upper fork member 4a and a lower fork member 4b integrally welded to a lower end of the upper fork member 4a, the upper fork member 4a being curved in a transverse plane so as to be gradually enlarged externally from the region of a connected portion of the bottom bridge 3 with respect to a longitudinal center line L—L of the motor tricycle. The lower fork member 4b, however, is substantially straight and extends substantially parallel to the longitudinal center line L—L, as can be best seen in FIG. 3. The front fork 4 whose lower region is enlarged in transverse spacing embraces a low pressure front wheel W having a wide balloon tire 5.

Figure 3:
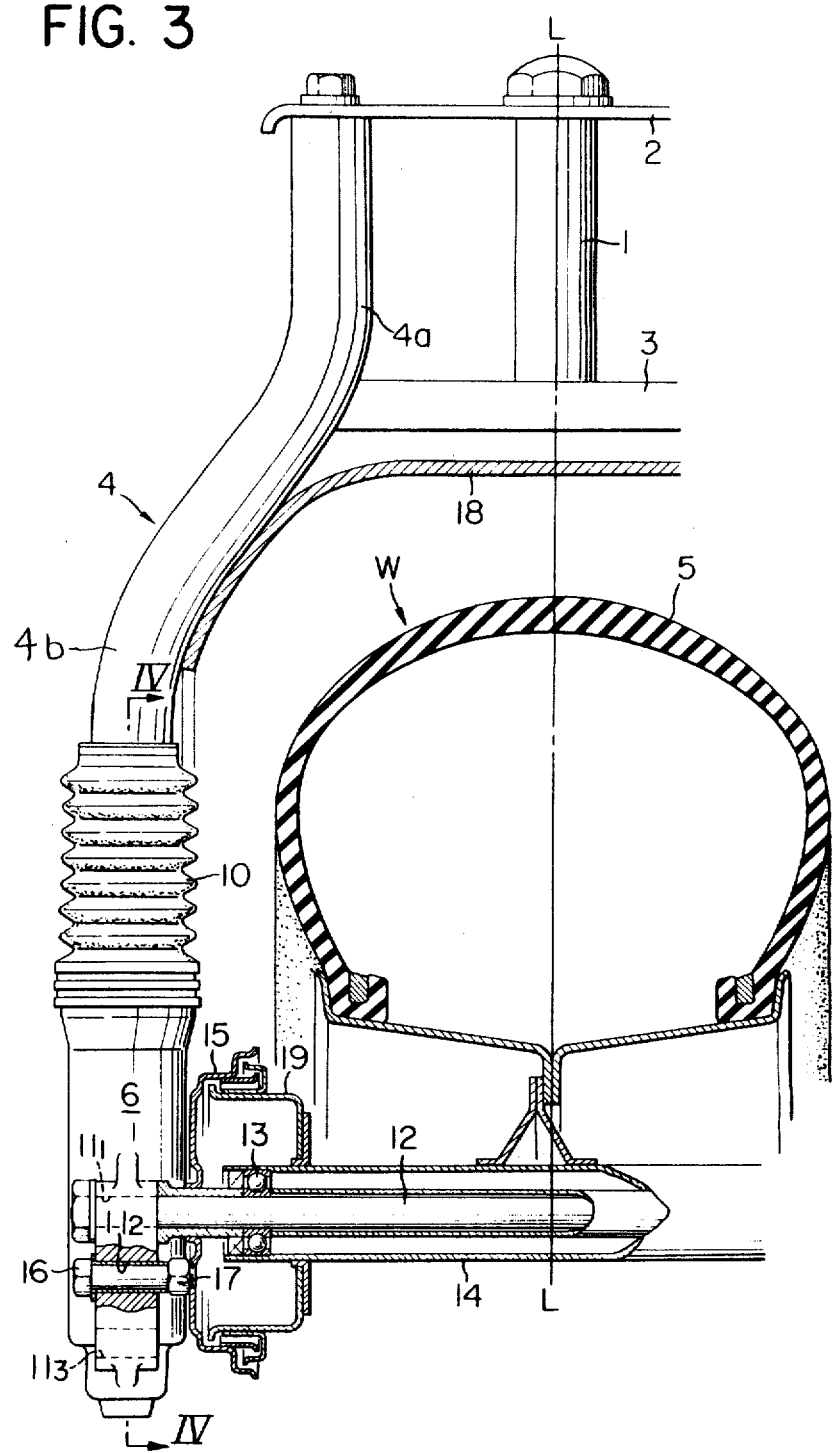
FIG. 3 is a sectional view taken on line III—III in FIG. 2.

As shown in FIG. 3, a cylindrical bottom case 6 is engaged around each of the lower portions of the lower fork members 4b of the left and right front forks 4 for vertical sliding movement. A closed space S is formed by the lower fork member 4b and the bottom case 6, and a damper 7 is housed in the closed space S, the damper 7 being, for example, a pneumatic cylinder having a lower end connected to the lower end of the bottom case 6 and an upper end connected to the lower end of the upper fork member 4a of the front fork 4. Within the closed space S is housed a coil spring 8 so as to encircle the outer periphery of the damper 7, the coil spring 8 being engaged between the lower end of the upper fork member 4a and the lower end surface of the bottom case 6 to bias the bottom case 6 away from the front fork 4.

A clearance between the upper end of the bottom case 6 and the outer periphery of the lower fork member 4b is sealed in oil-tight fashion by means of a dust seal 9 provided on the upper end of the bottom case 6, and grease is applied as a coating between the front fork 4 and the bottom case 6. Between the upper end of the bottom case 6 and the outer periphery of the upper fork member 4a is a bellows-like boot 10 to cover the upper end of the opening of the bottom case 6 and the dust seal 9 so as to prevent damage of the dust seal resulting from freezing of the outer peripheral surface of the lower fork member 4b.

Figure 4:
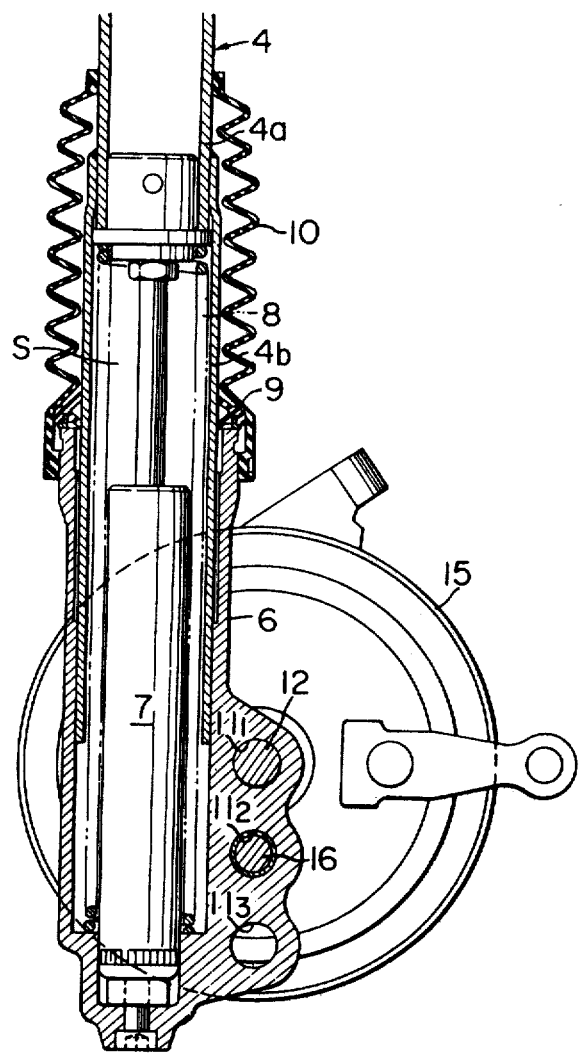
FIG. 4 is a sectional view taken on line IV—IV in FIG. 3.

At the lower portion of the bottom case 6 is a side protrusion provided with a plurality of axle mounting holes $11_1$, $11_2$ and $11_3$ arranged with vertical spacing and offset from the longitudinal center line of the case in the plane of the travel direction of the vehicle so that the vehicle may be adjusted in height, and a front axle 12 is selectively fastened into one of the mounting holes (hole $11_1$ in FIGS. 3 and 4). A hub 14 is rotatably supported on the front axle 12 through a ball bearing 13 in a conventional manner, and the front wheel W with balloon tire 5 is mounted on the hub 14. A brake panel 15 is supported on the front axle 12. The brake panel 15 has a stop bolt 16 inserted therethrough utilizing one of the mounting holes which is not used to mount the front axle 12 (hole $11_2$ in FIGS. 3 and 4) and the bolt 16 is threadedly engaged by a nut 17 welded to the brake panel 15 to block rotation of the latter.

In the drawing, reference numeral 18 designates a front fender fastened to the front fork 4, and numeral 19 designates a brake drum fastened to the hub 14.

When the motor tricycle runs, the bottom case 6 moves up and down in a damped fashion relative to the front fork 4 through the damper 7 and the coil spring 8 to damp and absorb shocks and vibrations from the front wheel W.

As described above, in accordance with the present invention, the bottom case 6 with the suspended front wheel W is fitted on the lower portion of the front fork 4 for relative vertical movement between extended and retracted positions and within the space S formed in the front fork 4 and bottom case 6 are housed the damper 7 connected thereto and the coil spring 8 for biasing the front fork 4 and bottom case 6 to be in extended position, and therefore, the damper 7 and coil spring 8 absorb, in a damping fashion, shocks and vibrations applied to the front wheel W. This improves the riding comfort, and in addition, the damper 7 and coil spring 8 are not exposed externally and can not contact obstacles which allows them to function at all times without damage thereto.

What is claimed is:

1. A front wheel suspension for a motor tricycle having a frame with a head pipe, said suspension comprising a pair of front forks steerably supported on the head pipe, a pair of bottom cases slidably fitted on said front forks for retracting and extending movements, said forks and cases defining respective enclosed spaces, means for supporting a front wheel of the tricycle from said cases, a wide tire mounted on said front wheel, damper means disposed in each of said enclosed spaces for coupling said forks and cases to oppose relative sliding movements thereof, and a coil spring disposed in each of said spaces to bias said forks and said cases in expanding direction, said pair of front forks each including an upper portion, and a lower portion fixedly secured to said upper portion, each of said bottom cases being slidably engaged with a respective one of said lower portions of the front forks, said upper portion of said front fork having a straight upper part and curved lower part integral with said upper part, said straight upper parts of the pair of forks extending upwardly parallel to each other with a relatively small spacing therebetween and connected to said head pipe, said curved lower parts being curved downwardly in a transverse plane away from one another to form a widened region for receiving said wide tire mounted on said front wheel, said lower portion of the front forks being substantially straight and engated with said upper portion at the lower ends thereof.

said means for supporting the front wheel comprising a front axle and side protrusions projecting from said bottom cases in the plane of the travel direction of the vehicle, said front axle being secured to said side protrusions.

2. A front wheel suspension as claimed in claim 1 wherein said coil spring surrounds said damper means.

3. A front wheel suspension as claimed in claim 1 further comprising a top bridge and bottom bridge rotatably connecting said front forks to the head pipe.

4. A front wheel suspension as claimed in claim 1 wherein each of said curved lower parts of said upper portions of said front forks is curved and gradually widened outwardly in a region extending from said bottom bridge to said axle.

5. A front wheel suspension as claimed in claim 1 comprising dust seal means between said cases and said front forks.

6. A front wheel suspension as claimed in claim 5 comprising a deformable cover on said forks and cases enclosing said dust seal means.

7. A front wheel suspension as claimed in claim 1 wherein each of said side protrusions is provided with a plurality of vertically spaced axle-mounting holes, said front axle being selectively engaged in one of said axle-mounting holes.

8. A front wheel suspension for a motor tricycle having a frame with a head pipe, said suspension comprising a pair of front forks steerably supported on the head pipe, a pair of bottom cases slidably fitted on said front forks for retracting and extending movements, said forks and cases defining respective enclosed spaces, means for supporting a front wheel of the tricycle from said cases, damper means disposed in each of said enclosed spaces for coupling said forks and cases to oppose relative sliding movements thereof, and a coil spring disposed in each of said spaces to bias said forks and said cases in expanding direction, said means for supporting the front wheel comprising a front axle connected to said bottom cases and rotatably supporting said front wheel, each of said front forks being curved and widened outwardly in a region extending towards said axle, each of said bottom cases being tubular, having a longitudinal axis, and being provided with a plurality of vertically spaced axle-mounting holes offset from the longitudinal axis of the respective case, said front axle being selectively engaged in one of said axle-mounting holes.

9. A front wheel suspension as claimed in claim 8 wherein said axle-mounting holes are offset from the axis of the respective case in a forward direction with respect to forward travel of the tricycle.

10. A front wheel suspension as claimed in claim 8 comprising brake means secured to said cases and said front wheel for applying braking force to said wheel.

11. A front wheel suspension as claimed in claim 10 comprising attachment means securing said brake means to each of said cases, said attachment means being engaged in one of the axle-mounting holes not engaged by the front axle.

12. A method of suspending a front wheel from the frame of a tricycle comprising rotatably mounting the front wheel, having a wide tire thereon, on an axle, securing the axle to cases at opposite ends of the axle in selected vertically spaced axle-mounting holes offset from the cases longitudinally in the plane of the travel direction of the vehicle, slidably mounting the cases on the lower portions of a pair of spaced forks steerably mounted on the frame, shaping the forks to provide a relatively small spacing at the top thereof where the forks are attached to the frame, and curved portions to provide wider spacing for accommodating said wide tire, and resiliently damping relative sliding movement of the cases and forks from within closed spaces formed between the forks and cases.

* * * * *